(12) United States Patent
Ortega Martínez et al.

(10) Patent No.: US 7,021,704 B2
(45) Date of Patent: Apr. 4, 2006

(54) VEHICLE ROOF MODULE

(75) Inventors: Alberto Ortega Martínez, Valladolid (ES); Carlos Selgas Cáceres, Valladolid (ES); Ricardo González Merino, Burgos (ES); Pedro Sáiz Ausín, Burgos (ES); Francisco-Javier Martínez Moral, Burgos (ES); José-Ignacio González Saiz, Burgos (ES)

(73) Assignee: Grupo Antolin-Ingenieria, S.A., (ES)

( * ) Notice: Subject to any disclaimer, the term of this patent is extended or adjusted under 35 U.S.C. 154(b) by 0 days.

(21) Appl. No.: 10/510,327

(22) PCT Filed: Apr. 5, 2002

(86) PCT No.: PCT/ES02/00167

§ 371 (c)(1),
(2), (4) Date: Oct. 5, 2004

(87) PCT Pub. No.: WO03/084801

PCT Pub. Date: Oct. 16, 2003

(65) Prior Publication Data

US 2005/0146163 A1 Jul. 7, 2005

(51) Int. Cl.
*B60R 13/02* (2006.01)
*B62D 25/06* (2006.01)

(52) U.S. Cl. .......... 296/214; 296/210; 296/187.13; 296/190.08; 296/193.12

(58) Field of Classification Search .......... 296/210, 296/214, 29, 30, 20.01–203.04, 193.06, 193.12, 296/187.01, 187.13, 190.08
See application file for complete search history.

(56) References Cited

U.S. PATENT DOCUMENTS

| 3,016,263 A | * | 1/1962 | Rehmann | 296/216.04 |
| 4,036,522 A | * | 7/1977 | DeRees et al. | 296/154 |
| 4,749,225 A | * | 6/1988 | Fuerst et al. | 296/216.03 |
| 5,333,554 A | * | 8/1994 | Yamada et al. | 105/397 |
| 6,027,160 A | * | 2/2000 | Brodt et al. | 296/210 |

(Continued)

FOREIGN PATENT DOCUMENTS

DE 1 955 058 3/1972

(Continued)

*Primary Examiner*—Patricia L. Engle
*Assistant Examiner*—Greg Blankenship
(74) *Attorney, Agent, or Firm*—Ostrolenk, Faber, Gerb & Soffen, LLP (57) ABSTRACT

This roof module is designed for installation on a vehicle body in which an opening of approximately the same dimensions as the roof has been made and it is composed of the original roof panel (1), with its end finish, a complete conventional interior trim (2), usually of larger dimensions than the afore-mentioned panel, as well as pre-installed interior accessories (3) and (3'). At its front and rear edges the roof panel (1) is provided with dished recesses (10) which engage underneath the front (4) and rear (5) body cross members, covering it at least, the cross members (4) and (5) being closed at the top with a panel (7) that covers them and provides the form and finish matching the exterior of the vehicle. The roof panel (1) has perimeter steps (11) and (13) that each match up positionally with respective peripheral shoulders (9) provided both on the front (4) and rear (5) cross members, as well as on the side rails (6) of the body, forming between them a contact surface through which the roof module is joined to the body by adhesive.

13 Claims, 10 Drawing Sheets

U.S. PATENT DOCUMENTS

| | | |
|---|---|---|
| 6,340,204 B1 | 1/2002 | Seifert |
| 6,347,829 B1 * | 2/2002 | Hanyu .................. 296/210 |
| 6,367,872 B1 | 4/2002 | Bohm et al. |
| 6,543,841 B1 * | 4/2003 | Ohkubo ................ 296/210 |
| 6,623,068 B1 * | 9/2003 | Wieschermann et al. ... 296/210 |
| 6,786,538 B1 * | 9/2004 | Turk et al. ............. 296/216.01 |
| 6,860,014 B1 * | 3/2005 | Wieschermann et al. .. 29/897.2 |

FOREIGN PATENT DOCUMENTS

| | | |
|---|---|---|
| DE | 37 25 807 A1 | 2/1988 |
| EP | 0 300 889 A1 | 1/1989 |
| WO | WO 98/39170 | 9/1998 |

* cited by examiner

VEHICLE ROOF MODULE

This is a U.S. national stage of application No. PCT/ES02/00167, filed on Apr. 5, 2002.

OBJECT OF THE INVENTION

The present invention refers to a roof module for vehicles, which, besides a full conventional interior trim with pre-assembled interior accessories, includes a part of the vehicle body, specifically the original roof panel that will form the outside roof, as well as part of the body frame connected directly with the vehicle roof, so that the roof module forms a pre-assembled unit which may be fitted quickly to the rest of the vehicle body, an operation which is performed from inside the actual vehicle.

For this purpose, both the roof panel and the vehicle body frame must have specific features and design which will enable them to be joined together quickly by means of adhesives or other conventional connecting means.

BACKGROUND OF THE INVENTION

As is well-known, vehicle roofs have an interior trim which must possess certain minimum qualities, such as being self-supporting, readily adaptable to the different shapes of vehicle roofs, lightweight, endowed with good sound absorption and heat insulation properties and having an external appearance that is pleasing to the eye and to the touch.

For this purpose, multi-layer trims are normally used consisting of one layer that may be composed of different substances, such as rigid or flexible foams, fibre glass, thermoplastic or vegetable-based materials, paper or plastic sheets, adhesives and, lastly, a light fabric outer layer that forms the external or decorative face.

This trim is mounted on the metal body frame of the vehicle and then the interior accessories, such as sun visors, grab handles, lights, head airbag, speakers, electrical wiring, etc. are fitted on it, all these operations being performed manually from inside the vehicle, which makes the complete installation of the roof rather a complicated process.

Car makers have therefore been asking their suppliers not only for roof trims, but also that the roof trim should form a pre-assembled unit, including the different roof accessories, such as sun visors, grab handles, light units, electrical wiring or head airbags, in which the assembly of all these items is carried out at the supplier's plant. These modular trims include a series of clips or quick fasteners that may be installed on the actual body: frame or roof of the vehicle, this operation generally being performed by offering up the trim with the pre-assembled accessories through the vehicle windscreen and proceeding to fasten the trim quickly from inside the vehicle itself by means of the above-mentioned clips.

In this way, the trim is installed with at least some of its accessories pre-fitted in a single operation, an installation operation that is carried out quickly and simply by means of the afore-mentioned fastening clips.

This type of solution may be observed, for instance, in the following PCT patents of the same applicant: WO98/48179, WO98/47741, WO99/43517, ES99/00305, ES01/00391 or ES01/00924.

These patents, however, only offer a partial answer to the needs of car makers, as they are not capable of adapting to the wide range of solutions required by such external items as sun roofs or panoramic roofs, where it would be an advantage if the trim could include all the accessories or modifications needed for it to be able to be used in all cases.

A more highly developed solution is the one in which the roof trim includes, besides the above-mentioned accessories, the roof panel and even the sun roof or panoramic roof. This assembly, which may be called a roof module, can be installed in a downward direction, so that the roof module panel first rests and is then fastened to the perimeter frame, which would be an integral part of the vehicle.

This type of installation has major drawbacks as the dimensions of the roof trim are considerably larger than those of the actual roof and, consequently, larger than those of the opening left in the top of the vehicle, so inserting it through the upper hole in the top of the vehicle body is extremely complicated.

On top of this it should be pointed out that the roof trims are very fragile and, if not bent properly, may break or have cracks or distortions that are still there after installation, imperfections which are unacceptable today in the automobile industry.

To overcome this problem the roof trim may be divided into two or more parts which are assembled separately on the vehicle. This system has the disadvantage that the complete module composed of the roof panel, the trim and the accessories cannot be installed in a single operation, so the advantages of modularity sought in systems of this type are lost.

An attempt may also be made to bend the trim during the process of installation on the vehicle, but this calls for special highly flexible trims, which, besides being higher priced and heavier, have poorer sound absorbing properties. Furthermore, very expensive manipulators have to be used for bending the trim during assembly on the vehicle.

DESCRIPTION OF THE INVENTION

The object of the invention is a roof module which includes the original roof panel and a full conventional trim together with the respective interior accessories which is fitted to the body frame of the vehicle from the inside, i.e. in an upward direction, after modifying and bracing the vehicle frame at a number of points to permit the afore-mentioned assembly process.

In this way, a conventional trim may be used, i.e. a trim of dimensions larger than those of the roof panel and which, therefore, protrudes from the panel, basically at the sides, as the trim usually covers part of the vehicle side pillars. Similarly, besides maintaining all its characteristics and properties, the trim retains its overall dimensions without having to divide it into sections, so that complete installation may be done in a single process, with the consequent saving in the time and cost of the operation.

Since a conventional trim is used, manufacture of the roof module is also simplified as the trim and accessories are produced and assembled with the technology used normally by the supplier, and only the roof panel as to be included. In this way, the properties currently offered by the roof trim are assured in terms of weight, cost, sound absorption, release of smells, fogging, etc. In addition, in solutions when it is necessary to modify the trim, the complete roof manufacture and assembly procedure has to be changed, which entails a major increase in its cost.

With the solution proposed, the installation system is the same as that currently used with roof trims with built-in accessories, i.e. the modular roof is inserted through the vehicle windscreen opening or rear hatchback and it is raised from inside the vehicle until it comes into contact with the vehicle frame, which is when the roof is joined to the body.

To carry out this installation, the vehicle body must have certain specific characteristics, as stated below.

The roof panel and the intermediate braces between the front and rear cross members are removed.

The front and rear cross members are retained in order to assure the stability of the body throughout the vehicle manufacturing process prior to assembling the modular roof and furthermore, so that it maintains the required strength and torsion characteristics.

The front and rear cross members are sealed at the top with a suitable shape and finish as they are going to be visible from the outside. In addition, the afore-mentioned cross members are strengthened with this operation.

The front and rear cross members and the side rails must be provided with perimeter shoulders in the form of flanges that facilitate the coupling and attachment of the roof module to the vehicle body frame.

The roof module includes the original vehicle roof panel, even painted the same colour as the body and with its front and rear edges provided with recesses provided to engage with and cover the vehicle body front and rear cross members from underneath.

These roof panel recesses have steps so that the cross member perimeter shoulders may rest on them forming between the two a flat surface that makes up the contact and attachment area.

The side edges of the roof panel also each have perimeter steps on which the peripheral shoulders of the rails rest, so that the connection between the roof panel and the vehicle body takes place on them, with the special feature that in this case the side rails are not covered entirely by the roof panel, but are only concealed by the interior trim of the roof module.

The roof panel has holes for fitting the interior accessories included in the roof module. These holes are basically located at the front and rear areas of the roof, where the roof panel covers the body cross members and matches the trim in its dimensions, whilst at the side areas, where the trim exceeds the dimensions of the roof panel, these holes will generally not be present as the accessories will only be pre-installed on the trim and fastened directly to the vehicle body frame, without traversing the roof panel.

All along this contact surface between the roof module and the body, i.e. on the perimeter steps of the module, one or more beads of adhesive will be applied to attach the roof module to the vehicle body and to provide suitable sealing properties. To stop the roof module from becoming detached while the adhesive is setting, a series of mechanical fastening elements may be used which will be applied all along the contact line.

These fastening elements are of a temporary nature as their sole purpose is to enable the adhesive to set, but they may be retained after the adhesive has taken effect inasmuch as it proves more economical not to have to remove them and in any case they may help to secure the modular roof.

To assist in the fastening of the roof with adhesive, between the trim and the metal roof panel, matching up with the perimeter steps in the panel, stress transmission elements are designed to be fitted in order to enable pressure to be applied on the trim so that the metal panel adheres to the ends of the vehicle body frame cross members and rails without damaging the trim due to the pressure exerted.

Finally, to assist installation of the roof module to the body it is planned that the cross members should contain a series of holes that will permit a series of locating elements to be set in place which are arranged on the roof module and may be removed after the module is secured. Obviously, the fastening elements for the pre-installed interior accessories, which are fitted in the corresponding housings provided in the vehicle body frame rails, may also act as locating devices.

PREFERRED EMBODIMENT OF THE INVENTION

Figure 1:
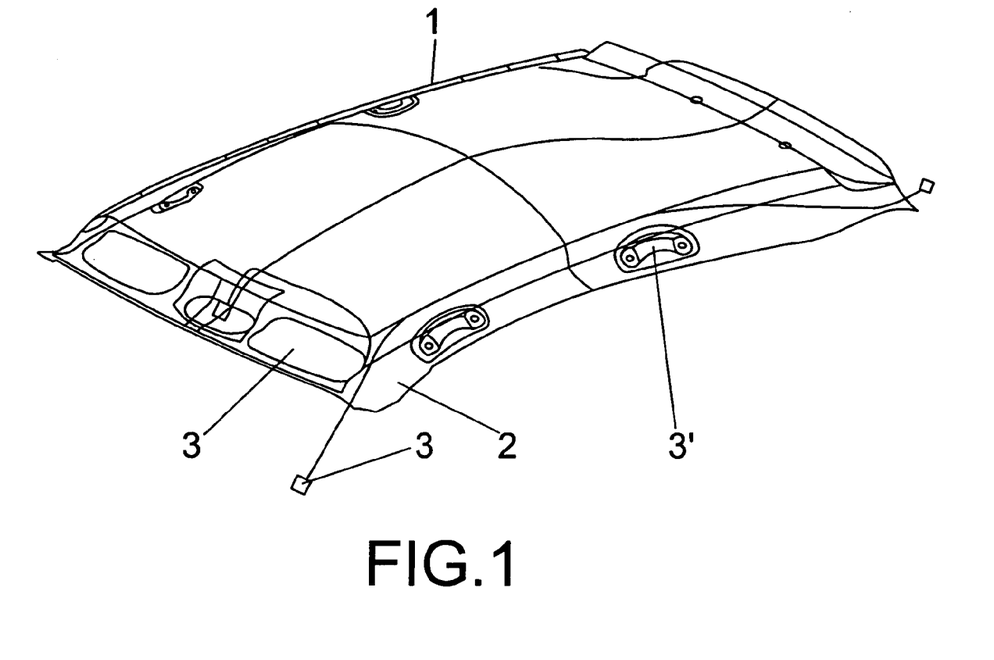
FIG. 1. It shows a perspective view of the roof module that is the object of the invention consisting of the roof panel, the interior trim and the respective interior accessories.

As may be observed in FIG. 1, the roof module includes the roof panel (1), the trim (2) and even the interior accessories (3) pre-installed on the afore-mentioned roof module.

The roof panel (1) is composed of the original roof panel, with its paintwork and end finish, whereas the interior trim is a full conventional trim, which, as may be seen in FIG. 1, has larger dimensions than those of the aforesaid panel, projecting beyond its side edges.

Figure 2:
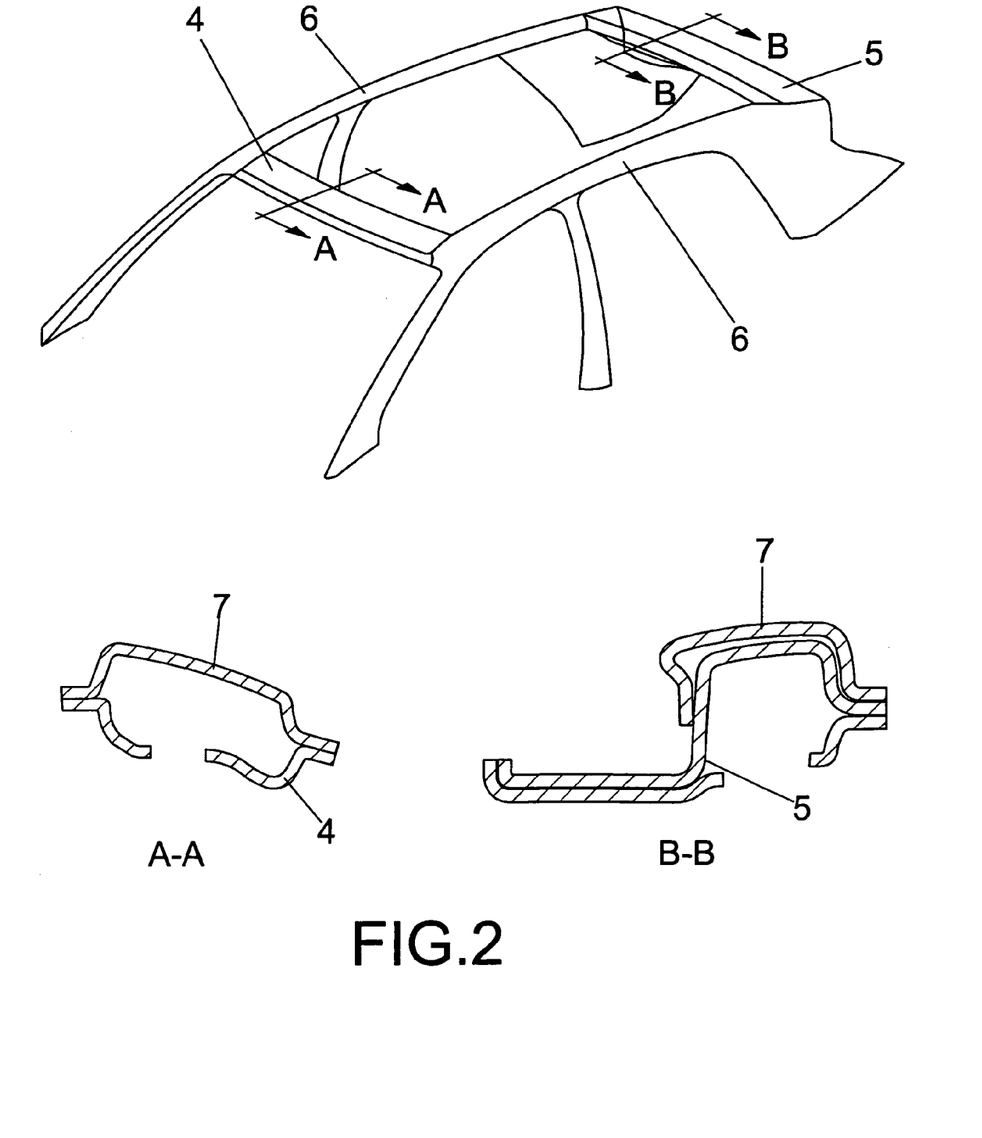
FIG. 2. It shows a perspective view of the vehicle body frame designed for the installation of the roof module that is the object of the invention, with close-ups of two sections of the front and rear cross members duly modified.

As regards the car body, as may be seen in FIG. 2, it has an opening, corresponding to the roof proper but maintaining the front cross member (4), the rear cross member (5) and the side rails (6).

Figure 3:
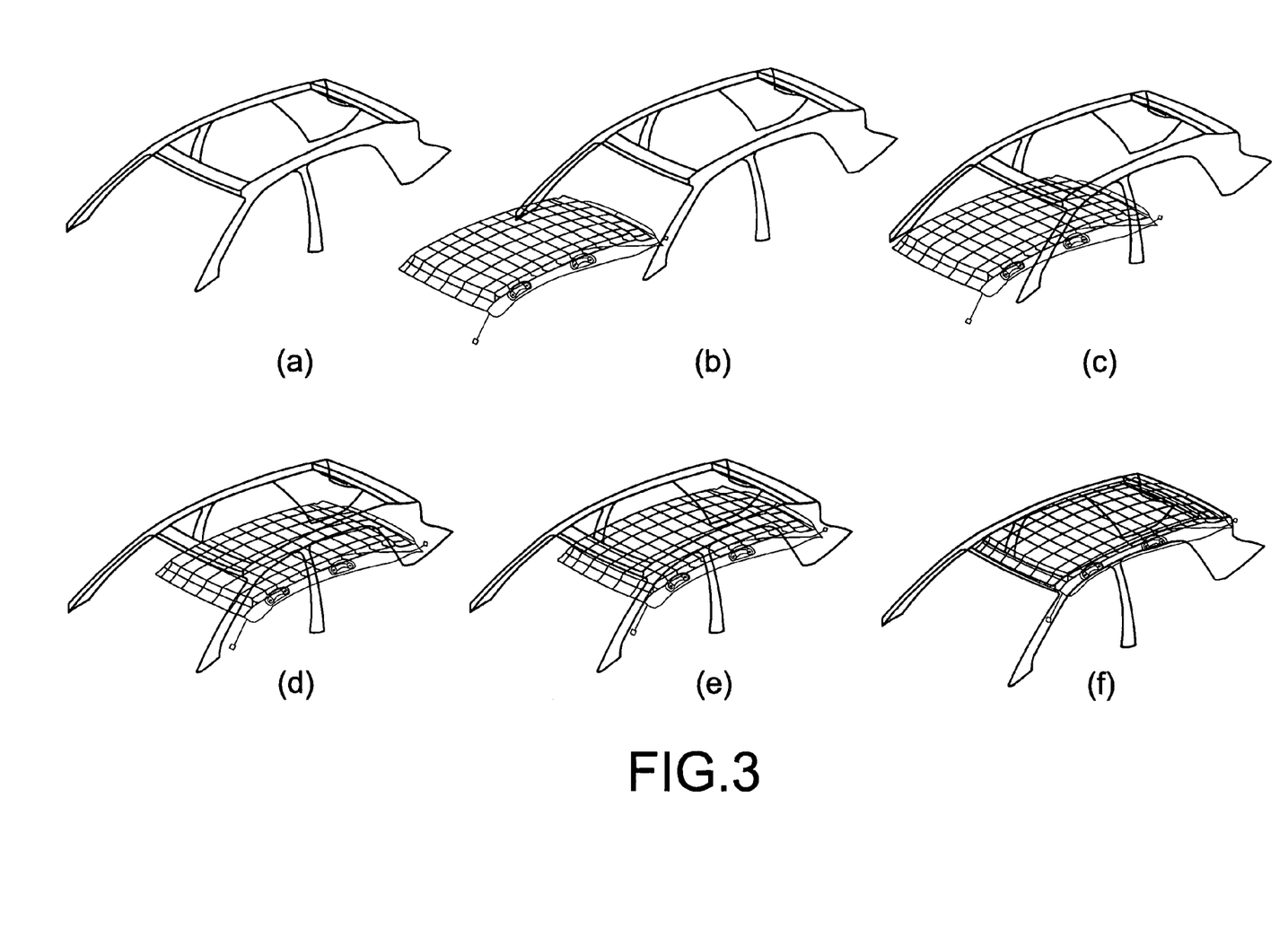
FIG. 3. It shows a sequence in the installation of the roof module that is the object of the invention on the vehicle body.

In this way, as can be seen clearly in FIG. 3, the roof module in question is inserted through the vehicle windscreen or rear hatchback opening and set in place on the body from inside the vehicle, i.e. in an upward direction, to prevent interference between the trim and the vehicle body, primarily against its side rails.

Figure 4:
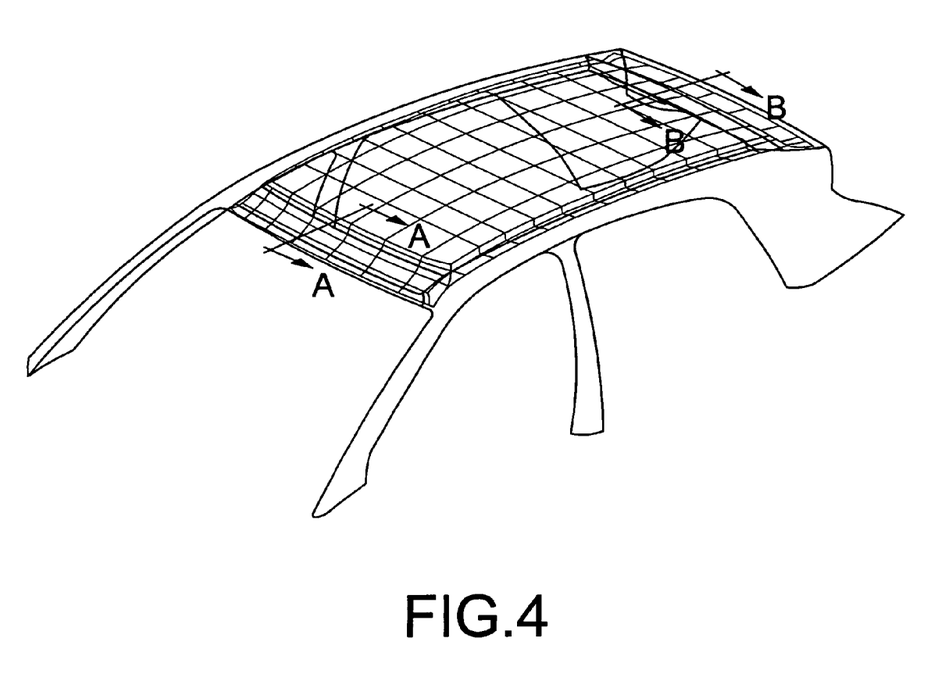
FIG. 4. It shows a perspective view in which the roof module that is the object of the invention is represented already mounted on the vehicle body.
Figure 5:
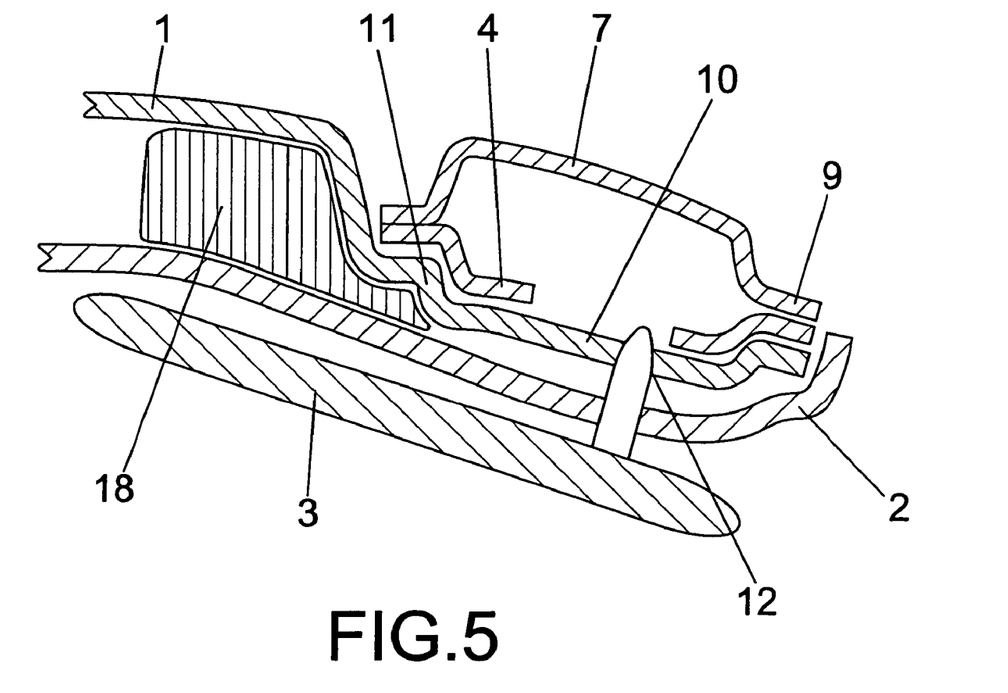
FIG. 5. It shows close-view sections of the contact area between the roof module and the front cross member of the body, while an accessory pre-fitted on the trim that also acts as a locating device during installation is represented as well.

In FIG. 4, the roof module that is the object of the invention is represented in place on the vehicle body.

In the following figures, sectional close views are represented in which the form exhibited by the roof panel (1) and the different modifications specified in the vehicle body may be observed.

As may be seen in FIG. 2, the front cross member (4) is closed at the top with a piece (7) that provides the form and finish pertaining to the vehicle body, as it will be visible on the outside, both elements being joined to form a kind of peripheral shoulder (9), which has a function that will be explained later. This piece (7) also acts as a strengthening and bracing element for the vehicle main frame. The rear cross member (5) is also reinforced with a piece (8) that covers it externally, provided likewise with a peripheral shoulder (9).

At its front and rear edges the roof panel (1) has dished recesses (10) that are engaged underneath the front (4) and rear (5) cross members, covering them completely, while the roof panel has one or more longitudinal steps (11) which line up with the peripheral shoulders (9) of the front (4) or rear (5) cross members. As is seen clearly in FIGS. 5, 6, 8 and 9, between the steps (11) and the shoulders (9) there extends a flat contact surface through which the roof module and the body are joined together.

The dished recesses (10) in the roof panel (1) are provided with holes (12) that permit the fastening of the interior accessories comprised in the roof module, so that said interior accessories are pre-fitted on the trim (2) and the roof panel (1). This type of fastening takes place basically at the front and rear edges of the roof module, where the trim (2) and the roof panel (1) have very similar dimensions, while the fastening devices may also have the function of aligning the position of the roof module during its installation.

Figure 7:
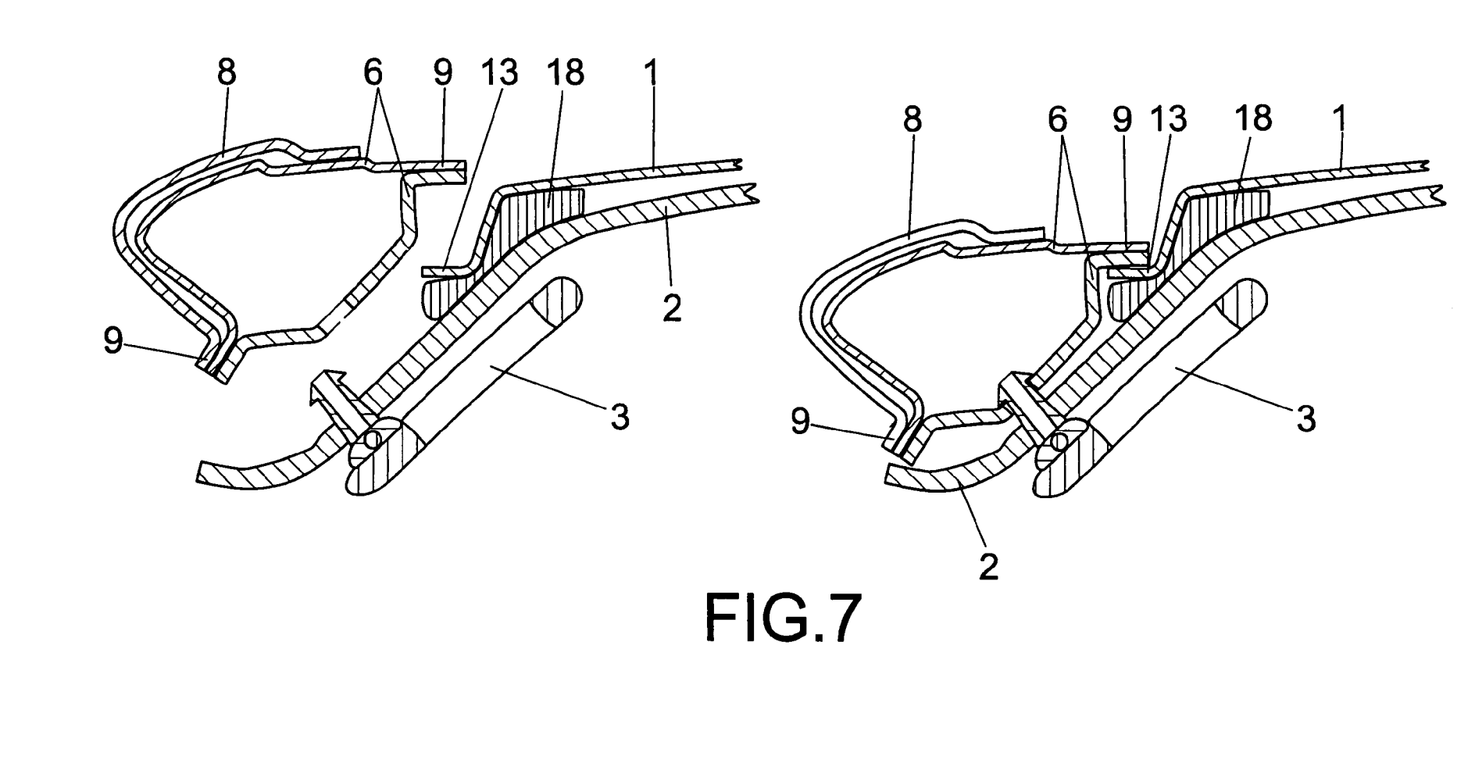
FIG. 7. It shows close view sections of the contact area between the roof module and a body side rail, in which it may be observed that the trim has larger dimensions than the roof panel, so the interior accessory is pre-fitted on the trim only.

FIG. 7 shows the contact area between the roof module and some of the side rails (6) of the vehicle body, an area in which the trim (2) is longer than the panel (1), so that the interior accessories are only pre-fitted to the trim (2) and will be fixed finally in the housings in the rail (6), without passing through the roof panel (1).

As may be seen also in FIG. 7, the roof panel (1) has a step (13) of matching dimensions which is engaged below the peripheral shoulder (9) of the side rails (6).

Figure 6:
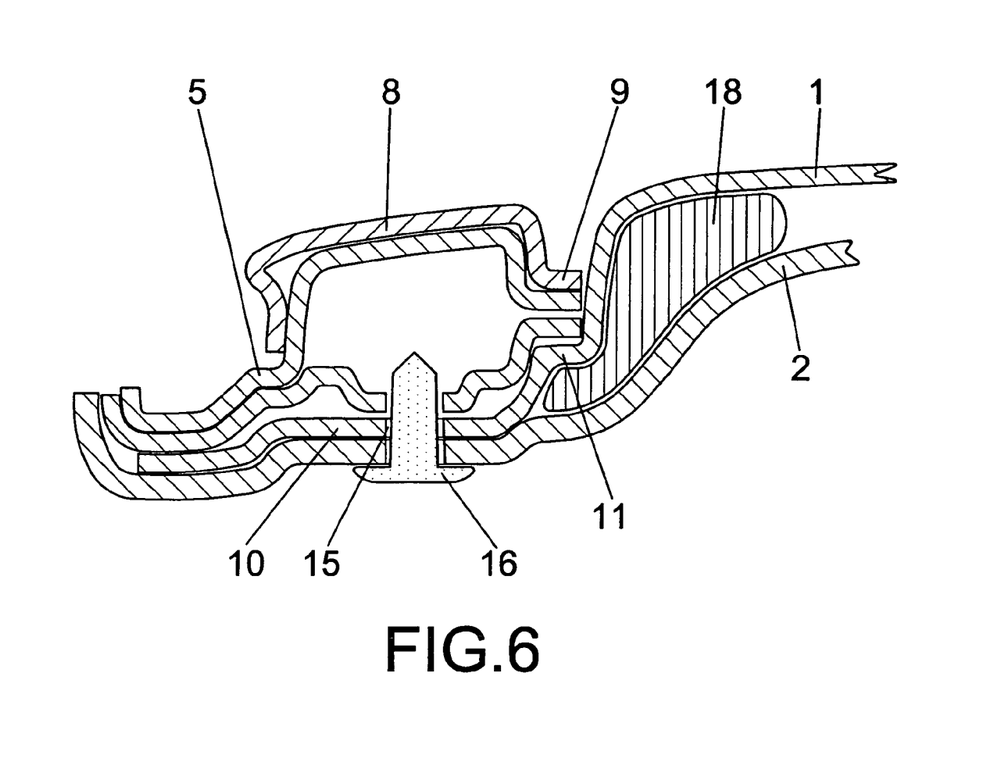
FIG. 6. It shows close view sections of the contact area between the roof module and the body rear cross member, including a locating element to assist installation.

The roof panel also has a number of holes (15) that enable a series of locating devices (16) to be provided on the roof module which may be removed after securing the module to the body. FIG. 6 shows a locating element made preferably of a plastic material, which may even be fitted permanently.

Figure 8:
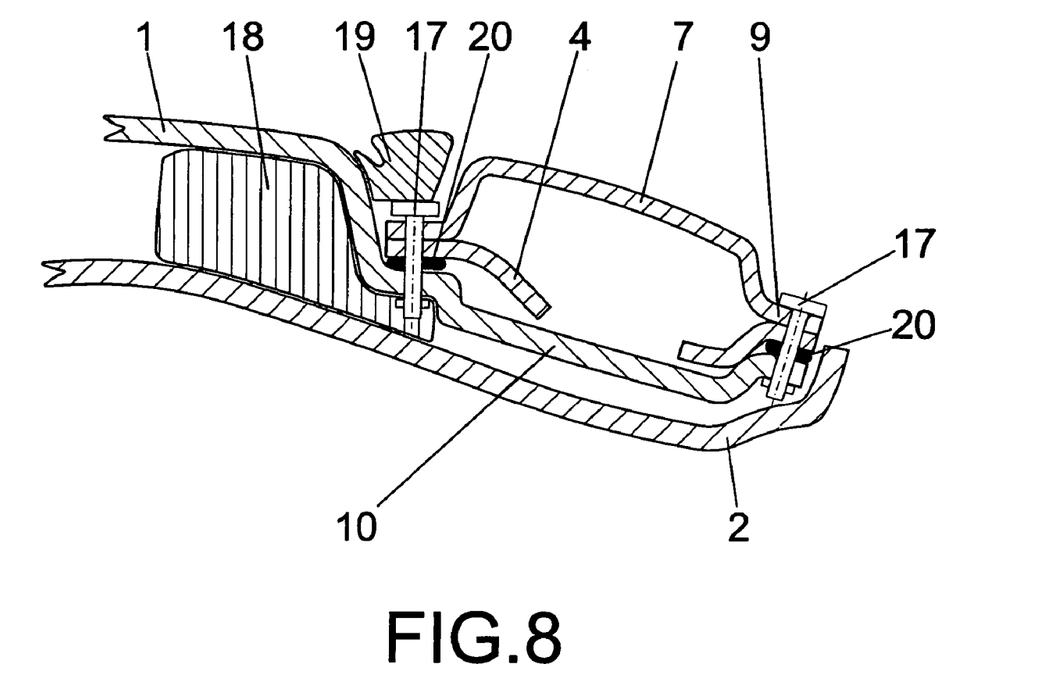
FIG. 8. It shows the same section as FIG. 5 but in which bonding areas are shown, including temporary mechanical fasteners with the function of supporting the roof module while the adhesive is setting.
Figure 9:
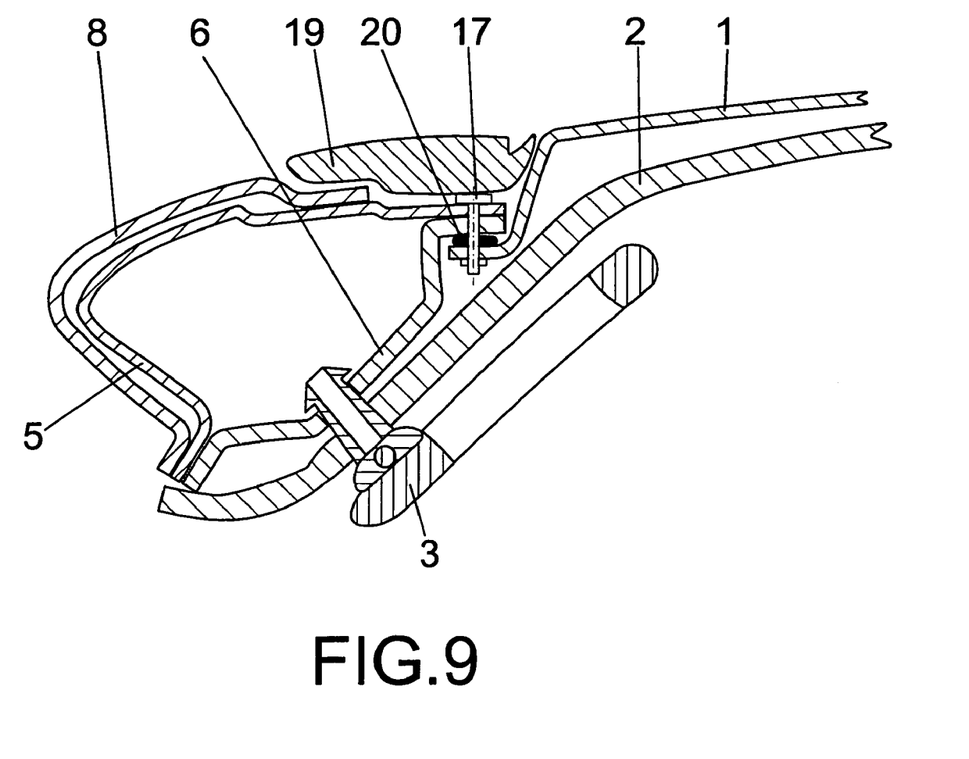
FIG. 9. It shows the same section as FIG. 6 but in which bonding areas are shown, including temporary mechanical fasteners with the function of supporting the roof module while the adhesive is setting.
Figure 10:
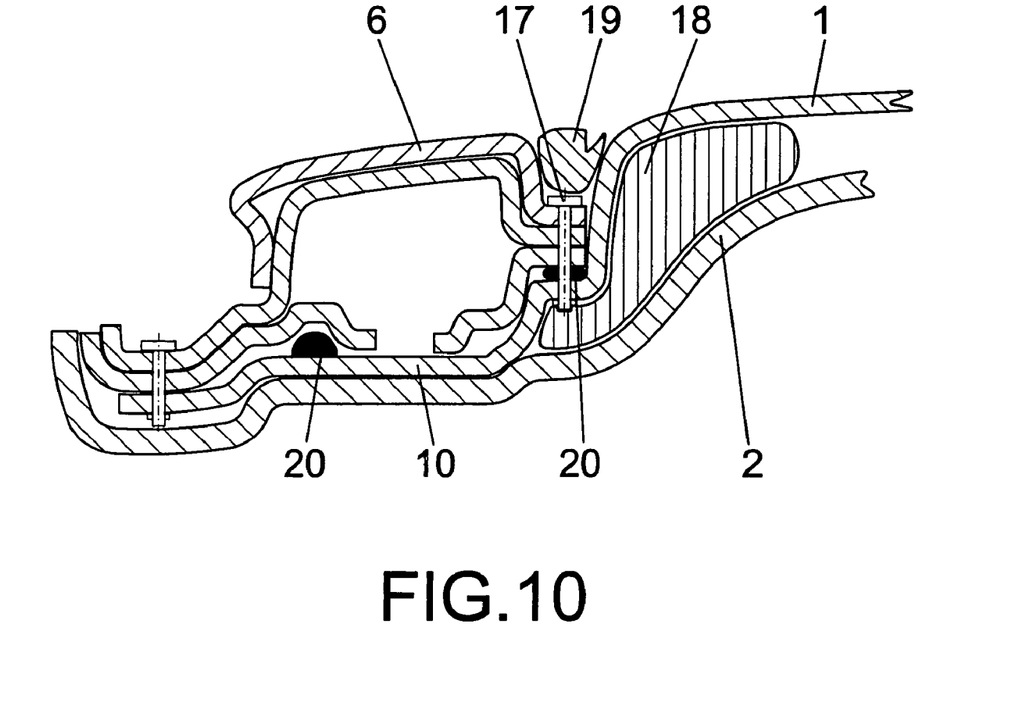
FIG. 10. It shows the same section as FIG. 6 but in which bonding areas are shown, including temporary mechanical fasteners with the function of supporting the roof module while the adhesive is setting.

The roof module and the vehicle body are joined together by applying a bead or layer of adhesive (20) between the perimeter steps (11) and (13) of the roof panel (1) and the peripheral shoulders (9) of the cross members and rails, as represented in figures (6), (7) and (8).

Certain points of the roof panel contact steps are provided with mechanical fastenings (17), which are of a temporary nature and enable the roof module to be secured while the adhesive is setting and may be removed or maintained once it has set.

As also may be observed in any of the FIGS. 5 to 10, stress transmitters (18) fitted between the roof panel (1) and the trim (2), specifically in the areas pertaining to the perimeter steps in the roof panel (1), which occupy the space between the concealed side of the trim and the roof panel in the area closest to the glued joints, barring the gap between the two, so that these elements (18) enable sufficient force to be applied on the trim so that the metal panel sticks properly to the cross member and rail shoulders (9), without damaging the trim (2) as a result of the pressure exerted on it.

Lastly, it should be mentioned that between the edge of the roof panel (1) and the cross members and rails there is a kind of channel that may be covered with embellishers (19), as also shown in the adjoining figures.

What is claimed is:

1. A roof module for vehicles, for installation on a vehicle body including a front cross member having peripheral shoulders, a rear cross member having peripheral shoulders, and sidewalls having peripheral shoulders, an opening being defined between said front cross member, said rear cross member and said side rails, said opening having approximately the same dimensions as the roof, the roof module comprising:
   a roof panel, having an end finish;
   a full conventional interior trim, and pre-installed interior accessories, the roof panel having dished recesses at its front and rear edges which are engagable underneath the front and rear cross members of the vehicle body so as to cover said front and rear cross members from underneath when the roof module is installed on the vehicle body, said roof panel also having two perimeter steps arranged to match up positionally with the respective peripheral shoulders of the front cross member, two perimeter steps arranged to match up positionally with the respective peripheral shoulders of the rear cross member of the vehicle body, and, on each side, a perimeter step arranged to match up positionally with a peripheral shoulder of the respective side rail of the vehicle body, when the roof module is installed on the vehicle body, said perimeter steps jointly making up a contact surface through which the roof module is joinable to the vehicle body.

2. The roof module for vehicles according to claim 1, wherein the roof panel has a through opening for fastening devices of some of the interior accessories comprised in the roof module, so that the fastening devices of these accessories will pass through both the trim and the roof panel.

3. The roof module for vehicles according to claim 1, wherein the trim is dimensioned to exceed dimensions of the roof panel at side areas of the roof module, so that the interior accessories positioned in said side areas are pre-installed on the trim only and arranged to be fastened directly to a frame of the vehicle body, without passing through the roof panel.

4. The roof module for vehicles according to claim 1, wherein the front and rear cross members are provided with a series of holes and a series of locating elements are arranged on the roof module so as to assist installation of the roof module on the vehicle body, by being insertable in the corresponding series of holes in the front and rear cross members to which the roof module is to be attached.

5. The roof module according to claim 4, wherein the locating elements are arranged to be removed after the roof module has been attached to the vehicle body.

6. The roof module for vehicles according to claim 1, wherein a plurality of holes are provided for receiving mechanical fasteners for securing the roof module at certain points of the roof panel perimeter steps during setting of an adhesive applied at said perimeter steps during installation of the roof module.

7. The roof module for vehicles according to claim 1, wherein stress transmitters are arranged between the roof panel and the trim so as to match up with the perimeter steps in the roof panel, the stress transmitters being configured and arranged to enable force to be applied to the trim for pressing the roof panel against the peripheral shoulders of the front and rear cross members and side rails of the vehicle body, during installation of the roof module to said vehicle body, without damaging the interior trim due to pressure exerted.

8. The roof module for vehicles according to claim 1, wherein the trim has larger dimensions than the roof panel.

9. The roof module according to claim 1, wherein the conventional trim is a multilayer trim.

10. A vehicle body having a roof module according to claim 1, said vehicle body further including said front cross member having peripheral shoulders, a rear cross member having peripheral shoulders, and side rails having peripheral shoulders.

11. The vehicle body according to claim 1, wherein the roof module is attached underneath the front and rear cross members, said front and rear cross members being closed on top by panels that cover the cross members and provide a form and finish pertaining to the exterior of the vehicle body by constituting a part of the roof that is not constituted by the roof module.

12. The vehicle body according to claim 1, wherein between the peripheral steps of the roof module and the peripheral shoulders of the front cross member, the rear cross member and the side rails, at least one string of adhesive is provided for bonding the roof module to the vehicle body.

13. The vehicle body according to claim 12, wherein at least one of the strings of adhesive forms a continuous ring so as to fill and added function of a sealing strip.

* * * * *